United States Patent
Dalsgaard (10) Patent No.: US 12,352,980 B2
(45) Date of Patent: Jul. 8, 2025

(54) FRAMING SYSTEM FOR SHAPING A LIGHT BEAM

(71) Applicant: HARMAN PROFESSIONAL DENMARK APS, Aarhus N (DK)

(72) Inventor: Carsten Dalsgaard, Silkeborg (DK)

(73) Assignee: Harman Professional Denmark Aps, Aarhus N (DK)

(*) Notice: Subject to any disclaimer, the term of this patent is extended or adjusted under 35 U.S.C. 154(b) by 909 days.

(21) Appl. No.: 17/525,048

(22) Filed: Nov. 12, 2021

(65) Prior Publication Data

US 2023/0152599 A1    May 18, 2023

(51) Int. Cl.
*G02B 27/09* (2006.01)
*G02B 5/00* (2006.01)

(52) U.S. Cl.
CPC ......... *G02B 27/0988* (2013.01); *G02B 5/005* (2013.01)

(58) Field of Classification Search
None
See application file for complete search history.

(56) References Cited

U.S. PATENT DOCUMENTS

| | | | |
|---|---|---|---|
| 8,950,904 B2* | 2/2015 | Cavenati | F21V 11/18 362/539 |
| 2005/0047148 A1* | 3/2005 | Gennrich | F21V 11/18 362/321 |
| 2012/0250332 A1* | 10/2012 | Jurik | F21V 11/18 362/321 |
| 2013/0039075 A1* | 2/2013 | Dalsgaard | F21V 11/183 362/321 |
| 2015/0109797 A1* | 4/2015 | Jurik | F21V 11/18 362/321 |

FOREIGN PATENT DOCUMENTS

WO    2015057235 A1    4/2015
WO    2010145658 A1    12/2021

* cited by examiner

*Primary Examiner* — Robert E. Tallman
(74) *Attorney, Agent, or Firm* — Artegis Law Group, LLP (57) ABSTRACT

The present disclosure provides a dynamic framing system for shaping a light beam. The framing system comprises a first shutter system comprising a first blade and a second blade, a second shutter system comprising a third blade and a fourth blade, and a blade divider forming an aperture. The first shutter system and the second shutter system are arranged on opposite sides of the blade divider. Each blade constitutes an intermediate bar in a five-bar linkage between two sets of outer bars, each set comprising a motorized bar and a passive bar. At least one of the motorized bars has a length being larger than a diameter of the aperture.

13 Claims, 8 Drawing Sheets

FRAMING SYSTEM FOR SHAPING A LIGHT BEAM

FIELD OF THE DISCLOSURE

The present disclosure relates to a framing system arranged to shape a light beam by movement of a plurality of blades.

BACKGROUND

Framing systems for shaping a light beam typically comprise a number of shutter blades being moved in and out of the light beam in order to adjust the shape of the beam.

The light beam is typically shaped/delimited/framed by adjusting the position of each shutter blade relative to the light beam and thereby achieving the wanted framing of the light beam. The framing systems are typically used in light fixtures such as moving heads, follow spots and spotlights generating a light beam. Such light fixtures comprise a light source generating a light beam and a number of optical components generating different optical effects.

Prior art document WO 2007/134609 discloses a framing system comprising a number of shutter blades cooperating with a number of motors to move the shutter blades in and out of the light beam. The shutter blades form a merged pile, where the shutter blades in the merged pile are placed with the front area placed over the front area of a first neighbouring shutter blade and the front area placed below the front area of the second neighbouring shutter blade. Forming the shutter blades in a merged pile leads to a thin assembly, where the operating edges of the shutters are operating substantially in the same plane. The shutter blades are movable mounted and co-operates with motors to move the shutter means in and out of the light beam. The shutter blades comprise a front end to delimit the beam of light and the two toothed sides and interacting with pinions on the motors. One motor is placed in a fixed position, and second motor is movable in a sideward direction. The two motors allow movement and adjustment of the individual shutter blades in order to delimit the light beam.

The framing system disclosed in WO 2007/134609 is however not very useful as it is very hard to manufacture. The toothed sides of the framing blades tend to break during use, especially during long-term use. The shutter blades must further be moved in a very controlled manner, as the shutter blades can be move in and out of the merged pile causing crucial failure of the framing system. This can for instance occur if the corners of two adjacent shutter blades are moved too far away from each other, which results is in the shutter blades getting mixed up so that they will not work properly.

SUMMARY

It is an object of embodiments of the disclosure to provide an improved framing system for shaping a light beam.

According to an aspect, the disclosure provides a framing system for shaping a light beam, the framing system comprising:
 a first shutter system comprising a first blade and a second blade,
 a second shutter system comprising a third blade and a fourth blade,
 a blade divider forming an aperture, the first shutter system and the second shutter system being arranged on opposite sides of the blade divider,
 wherein each blade constitutes an intermediate bar in a five-bar linkage between two sets of outer bars, each set comprising a motorized bar and a passive bar, and
 wherein at least one of the motorized bars has a length being larger than a diameter of the aperture.

The framing system comprises a first shutter system and a second shutter system, where the first shutter system comprises a first blade and a second blade and the second shutter system comprises a third blade and a fourth blade. The first and second blades are arranged substantially in the same plane, in a first plane. Likewise, are the third and fourth blades arranged substantially in the same plane, in a second plane, where the first and second planes are substantially parallel.

By movement of the first, second, third, and fourth blades in and out of a light beam, the shape of the light beam may be changed. It may be possible to move each of the first, second, third, and fourth blades individually. It should be understood, that the framing system may be built into a light fixture which may comprise additional filters, apertures, and other optical devices which may enable additional shaping of the light beam.

The first shutter system and the second shutter system are arranged on opposite sides of a blade divider, which blade divider forms an aperture. The aperture may define the largest dimension of the size of the light beam within the framing system in a direction transverse to the light beam, as the blade divider forming the aperture may be arranged transverse to the light source. The largest dimension of the light beam in a direction transverse to the light beam may occur when each of the blades are moved away from the aperture, so that no part of the aperture is shaded by a blade.

In one embodiment, the aperture may have a circular form. It should however be understood that the aperture may alternatively be elliptical, oval, or any other shape. In an embodiment, in which the aperture is circular, the size of the aperture may be defied by the diameter of the aperture. In alternative embodiments, in which the aperture is non-circular, the term "diameter" may be used to define the largest crosswise size; i.e. the largest size of the aperture in a direction transverse to the aperture. Thus, the use of the term "diameter" does not limit the disclosure to apertures having a circular shape.

By arranging the first and second shutter system on opposite sides of the blade divider forming the aperture, the first, second, third, and fourth blades may be arranged close to each other while still being arranged so that the first and second blades are on one side and the third and fourth blades are on the opposite side of the blade divider. When lowering the distance between the blades and the aperture, it may be possible to shape the light beam more precisely as light escaping between the blades and the blades diving may be omitted or at least considerably reduced. Furthermore, when arranging the first and second blades in a first plane, and the third and fourth blades in a second plane, where the first and second planes are substantially parallel and arranged on opposite sides of the blade divider, the number of layers may be reduced whereby the risk of overheating the framing system may be reduced.

Each of the first, second, third, and fourth blades constitutes an intermediate bar in a five-bar linkage between two sets of outer bars, each set comprising a motorized bar and a passive bar. Thus, each blade is arranged as the middle bar in a five-bar linkage between two sets of outer bars. Each of the sets of outer bars comprises a passive bar and a motorized bar. Preferably, the outermost bar in each of the sets of outer bars may be the motorized bar._

The outermost bar of each of the sets of outer bars may be pivotally arranged around an outer pivot, where the outer pivot may be arranged substantially at one end of the outermost bar. At the other end, the outermost bar may be attached to the second bar of the set of outer bars. The two bars may be attached to each other at a floating pivot to allow movement of the bars.

At least one of the motorized bars has a length being larger than a diameter of the aperture. By providing, at least one of the blades with a motorized bar with a length being larger than the diameter of the aperture, a single blade may be moved to fully cover the aperture at a wide range of angles of the blade, such as a range of at least +/−30 degrees.

Preferably, each of the motorized bars may have a length being larger than the diameter of the aperture to allow each blade to be moved to fully cover the aperture at a wide range of angles of the blade.

The length of the bars may be defined as the distance between two pivot points. Thus, the length of each of the motorized bars may be the distance between the outer fixed pivot point and the floating pivot point. The length of each of the passive bars may be distance between the floating pivot point and the attachment point at the respective blade (the intermediate bar), where the attachment point may preferably be a second floating pivot point.

Each blade may have a width being defined as the dimension of the blade in a direction parallel to a line extending between the two attachment points for the passive bars of the two sets of outer bars forming part of the five-bar linkage in which the blade forms the intermediate bar. In one embodiment, the width of the blade may increase in a direction perpendicular to the line between the two attachments points to form a blade substantially in the form of a trapezoid.

Each blade may have a height being defined as the dimension of the blade in a direction perpendicular to the width of the blade. In one embodiment, both the height and the width may be larger than the diameter of the aperture to thereby provide the ability of fully shading the aperture with a single blade.

It should be understood that each of the blades may have a width and a height being at least of the same size than the diameter of the aperture.

The framing system may further comprise a first blade guide and a second blade guide, where the first shutter system may be arranged between the blade divider and the first blade guide, and where the second shutter system may be arranged between the blade divider and the second blade guide. The first and second blade guides may each comprises a spring structure arranged to exert a pressure towards the first and second shutter system, respectively. By exerting a pressure towards the first and second shutter system, respectively, the movement of the blades may substantially be in only one plane; i.e. substantially parallel to the blade divider. Furthermore, the risk of bending of the blades due to high temperatures may be limited. In one embodiment, the spring structure may comprise a leaf spring.

The surfaces of the blades may be formed by a low frictional material to facilitate movement of the blades along the blade divider between the blade divider and the first and second blade guide, respectively.

A pin may extend from each of the blades, where each pin may extend through a corresponding slot in one of the first and second blade guides to constrain movement of each of the blades. The pin may extend from the outer surface of the blade in a direction away from the blade divider. A pin extending from the first blade may extend through a corresponding slot in the first blade guide. Likewise, may a pin extending from the second blade extend through a slot in the first blade guide. Oppositely, may a pin extending from the third blade and a pin extending from the fourth blade extend through corresponding slots in the second blade guide.

The respective pins may be movable arranged in the respective slots to constrain movement of the blades to a linear movement while at the same time allowing pivotal movement of the blades to thereby allow tilting of the blade during the linear movement and allow change of the tilt angle during the linear movement.

Each blade may be movable within a range of at least +/−30 degrees for any position of the pin in the corresponding slot, such as within a range of +/−40 degrees, +/−50 degrees, +/−60 degrees, or even higher.

As specified above, each of the motorized bars may extend between a fixed pivot point and a floating pivot point. Each of the motorized bars may be rotatable around the fixed pivot point between an upper limit position and a lower limit position. A blade may be rotated at least 30 degrees, such as at least 35 degrees, such as at least 40 degrees, such as at least 45 degrees, such as at least 50 degrees, or even more, when one of the associated motorized bars is in the upper limit position and the other one of the associated motorized bars is in the lower limit position.

To allow a light beam to pass through the framing system having a first blade guide and a second blade guide arranged on opposite sides of the first shutter system and second shutter system, respectively, the first blade guide may form a first aperture, and the second blade guide may form a second aperture, whereby a light beam may pass the first blade guide, then the blade divider, and finally the second blade guide. It should be understood that a light beam may likewise pass in the other direction; i.e. first through the second blade guide, then through the blade divider and finally through the first blade guide, as the numbering of first and second does not provide a limitation to the disclosure.

In one embodiment, the aperture, and the first and second apertures may be co-axially arranged.

A first slot and a second slot may be arranged in the first blade guide, whereas a third slot and a fourth slot may be arranged in the second blade guide. The first and second slots may be arranged to cooperate with a pin extending from the first and second blade, respectively, whereas the third and fourth slots may be arranged to cooperate with a pin extending from the third and fourth blade, respectively.

The first and second blade guide may each be formed as a substantially flat element, e.g. formed by a sheet material, such as a sheet of metal. The first aperture and the first and second slots may be formed as through holes in the substantially flat element forming the first blades guide, whereas the second aperture and the third and fourth slots may be formed as through holes in the substantially flat element forming the second blades guide. The first and second slots may extend on opposite sides of the first aperture, whereas the third and the fourth slots may extend on opposite sides of the second aperture. The first, second, third, and forth slots may be elongated openings having a width being considerable smaller than the length hereof. As an example, the width of a slot may be less than 20% of the length of a slot, such as less than 15%, such as less than 10%. The length of a slot may be larger than the diameter of the first and second aperture, such as 10% larger, such as 15% larger, such as 20% larger.

The framing system may further comprise a rotatable frame portion, where the first shutter system, the second shutter system, and the blade divider may be attached to the frame portion for rotation of the first and second shutter systems and the blade divider with the frame portion. The rotatable frame portion may as an example be arranged for rotation in a light fixture. The rotatable frame portion may be rotatably attached to a static frame portion which may be fixedly attached to a light fixture, such as inside a moving head.

The blade divider may be formed as a substantially flat element, e.g. formed by a sheet material, such as a sheet of metal. In one embodiment, the blade divider may be fixedly attached to the rotatable frame portion at a single point. Additionally, the blade divider may be movably attached to the rotatable frame portion by at least one spring structure, such as by two spring structures, such as by three spring structures, or by more spring structures. Thus, the blade divider may be stretched between the single attachment point to which it is attached and the additional attachment point(s) at which the spring structure(s) may be attached to thereby from a drum-skin-like structure. This may counteract the thermal expansion of the blade divider when heated by the light beam.

The first and second shutter systems may be attached to the rotatable frame portion by via the motorized bars which may each be attached to the rotatable frame portion at the fixed pivot point.

The first and second blade guides may likewise be attached to the rotatable frame portion. In one embodiment, the first and second blade guides may be at least partly attached via the spring structure arranged to allow the first and second blade guides to exert a pressure towards the first and second shutter system, respectively.

The framing system may further comprise an anti-collision system configured to control movement of the blades to avoid collision between the first blade and second blade and between the third blade and fourth blade, respectively. The anti-collision system may in one embodiment form part of a control system configured to also control rotation of a rotatable frame portion and/control of a light fixture in which the framing system may be integrated. It should, however, be understood, that the anti-collision system may be a separate system which may be in communication with a control system configured to also control rotation of a rotatable frame portion and/control of a light fixture.

In one embodiment, the anti-collision system may comprise a memory arranged to read an angular position of each of the motorized bars. The anti-collision system may further comprise a kinematic model configured to transform the angular position of the motorized bars to define an orientation and a position of the blades to control that the first and second blades and the third and fourth blades, respectively, do not overlap to thereby avoid collision between the first blade and second blade and between the third blade and fourth blade, respectively.

The framing system may comprise a plurality of actuators, where an actuator may be operatively attached each of the motorized bars. The actuators may be arranged for movement of the blades. In one embodiment, at least one of the actuators may comprise a step motor.

BRIEF DESCRIPTION OF THE DRAWINGS

Embodiments of the disclosure will now be further described with reference to the drawings, in which.

DETAILED DESCRIPTION

It should be understood that the detailed description and specific examples, while indicating embodiments of the disclosure, are given by way of illustration only, since various changes and modifications within the spirit and scope of the disclosure will become apparent to those skilled in the art from this detailed description.

Figure 1:
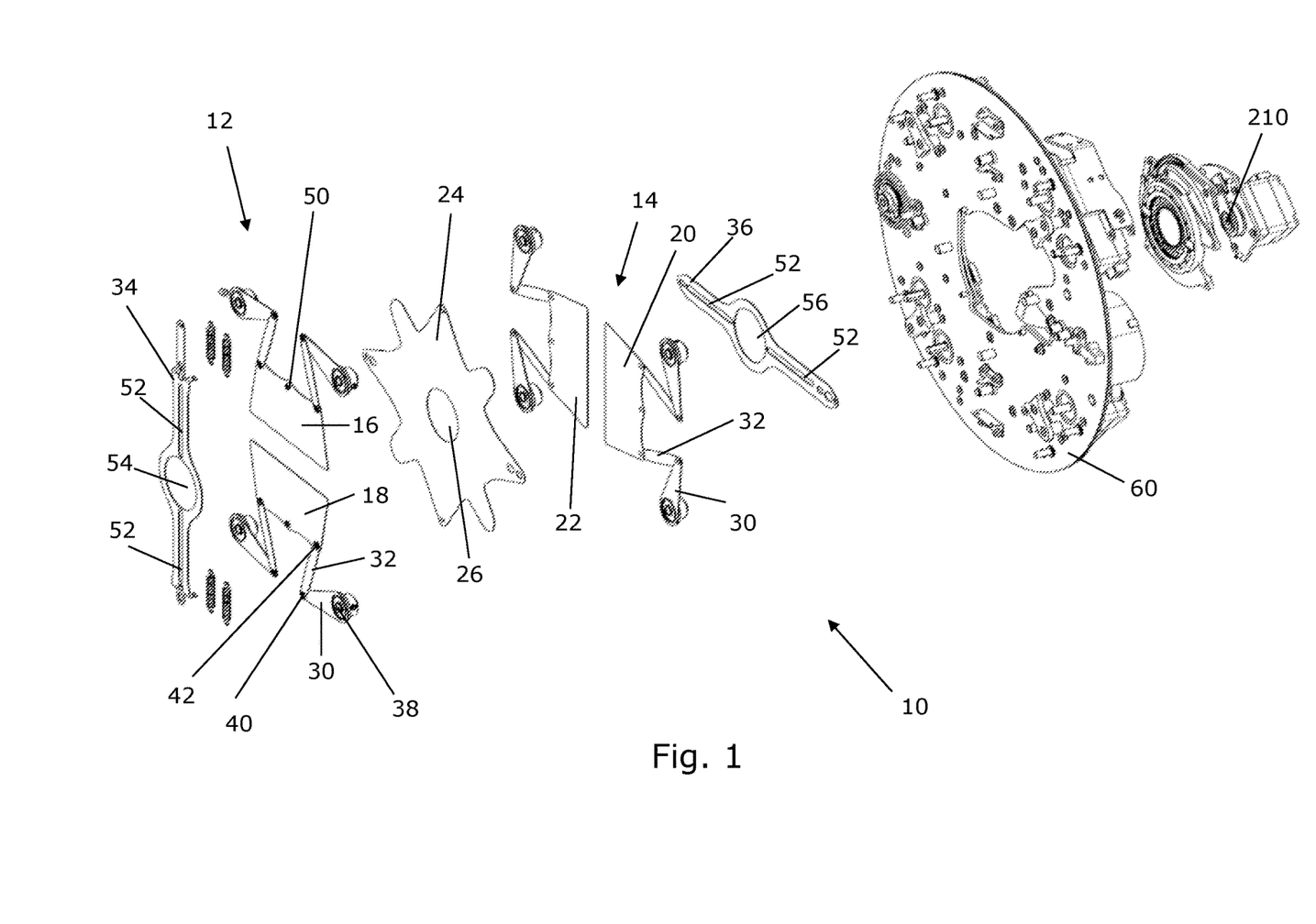
FIG. 1 illustrates an exploded view of an embodiment of a framing system.

FIG. 1 illustrates an exploded view of an embodiment of a framing system 10 for shaping a light beam (not shown). The framing system 10 comprises a first shutter system 12 and a second shutter system 14, where the first shutter system 12 comprises a first blade 16 and a second blade 18, and where the second shutter system 14 comprises a third blade 20 and a fourth blade 22.

The framing system 10 further comprises a blade divider 24 forming an aperture 26. The first shutter system 12 and the second shutter system 14 are arranged on opposite sides of the blade divider 24.

A light source 210 (see also FIG. 12) is arranged to generate a light beam which passes through the aperture 26 of the blade divider 24. By movement of the first blade 16, the second blade 18, the third blade 20, and the fourth blade 22 in and out of a light beam, the shape of the light beam can be changed. It may be possible to move each of the first, second, third, and fourth blades 16, 18, 20, 22 individually.

Each blade 16, 18, 20, 22 constitutes an intermediate bar 16, 18, 20, 22 in a five-bar linkage between two sets of outer bars 30, 32, each set comprising a motorized bar 30 and a passive bar 32. Each of the motorized bars 30 has a length being larger than the diameter of the aperture 26.

The framing system 10 further comprises a first blade guide 34 and a second blade guide 36. The first shutter system 12 is arranged between the blade divider 24 and the first blade guide 34, whereas the second shutter system 14 is arranged between the blade divider 24 and the second blade guide 36.

Each of the motorized bars 30 extends between a fixed pivot point 38 and a floating pivot point 40. Each of the passive bars 32 extends between the floating pivot point 38 and the attachment point 42 at the respective blade 16, 18, 20, 22 (the intermediate bar). Each of the attachment points 42 are a second floating pivot point.

As specified above, each of the motorized bars 30 has a length being larger than the diameter of the aperture 26, where the length of the motorized bar 30 is defined as the distance between the fixed pivot point 38 and the floating pivot point 40.

The framing system 10 comprises a plurality of actuators 44 (see e.g. FIGS. 6 and 7), where an actuator 44 is operatively attached each of the motorized bars 30, and thereby is arranged for movement of the blades 16, 18, 20, 22.

A pin 50 (see also FIG. 7) extends from each of the blades 16, 18, 20, 22 through a corresponding slot 52 (see also FIGS. 4, 5, and 7) in one of the first and second blade guides 34, 36 to constrain movement of the blades 16, 18, 20, 22.

Figure 4:
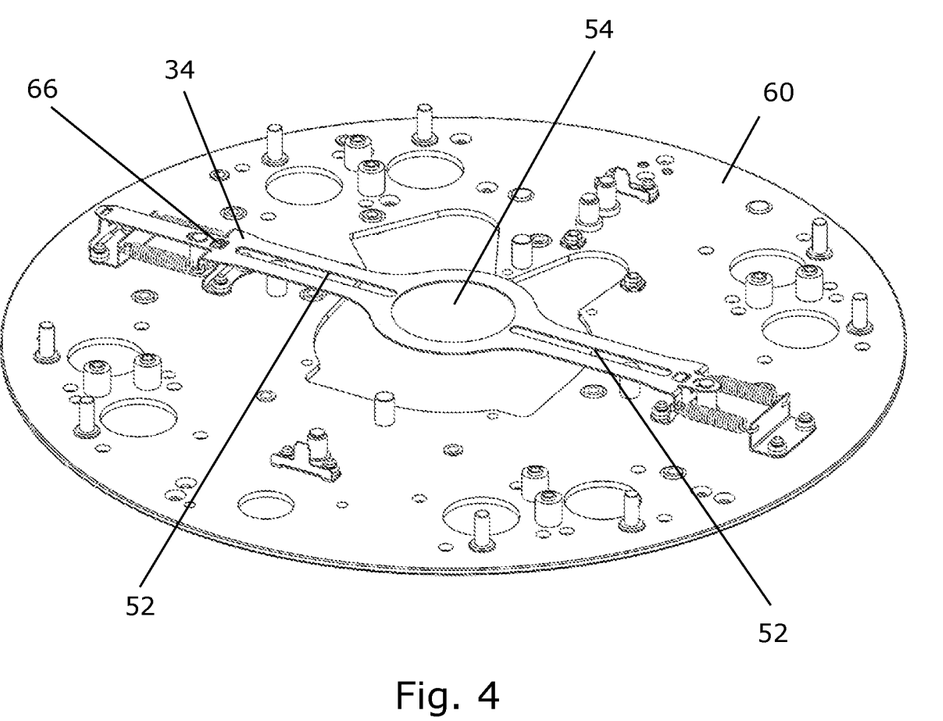
FIG. 4 illustrates an embodiment of a first blade guide.
Figure 5:
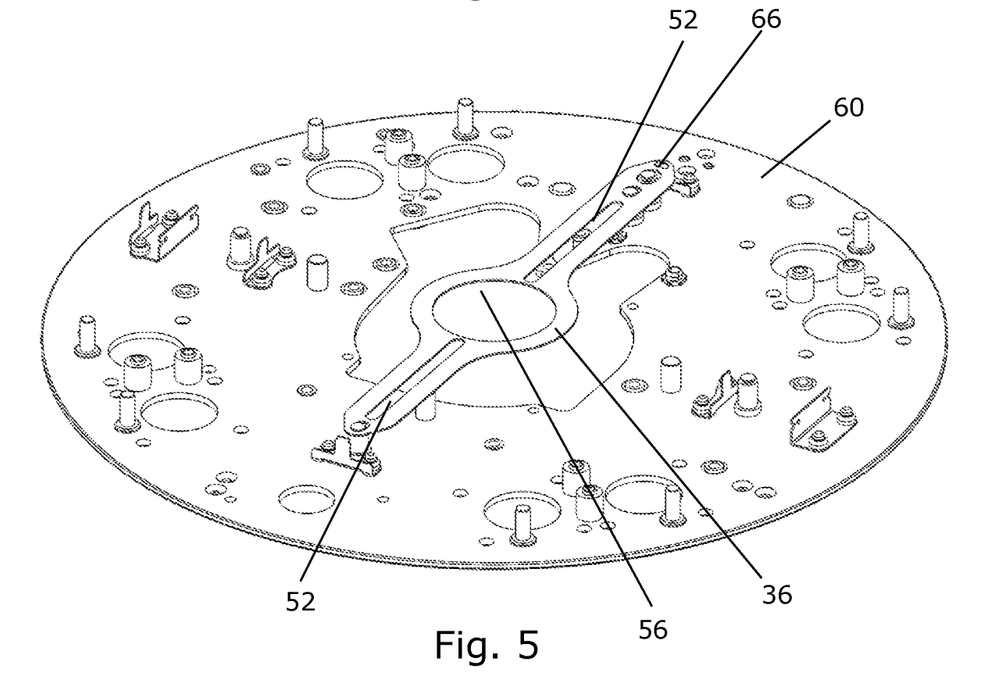
FIG. 5 illustrates an embodiment of a second blade guide.
Figure 7:
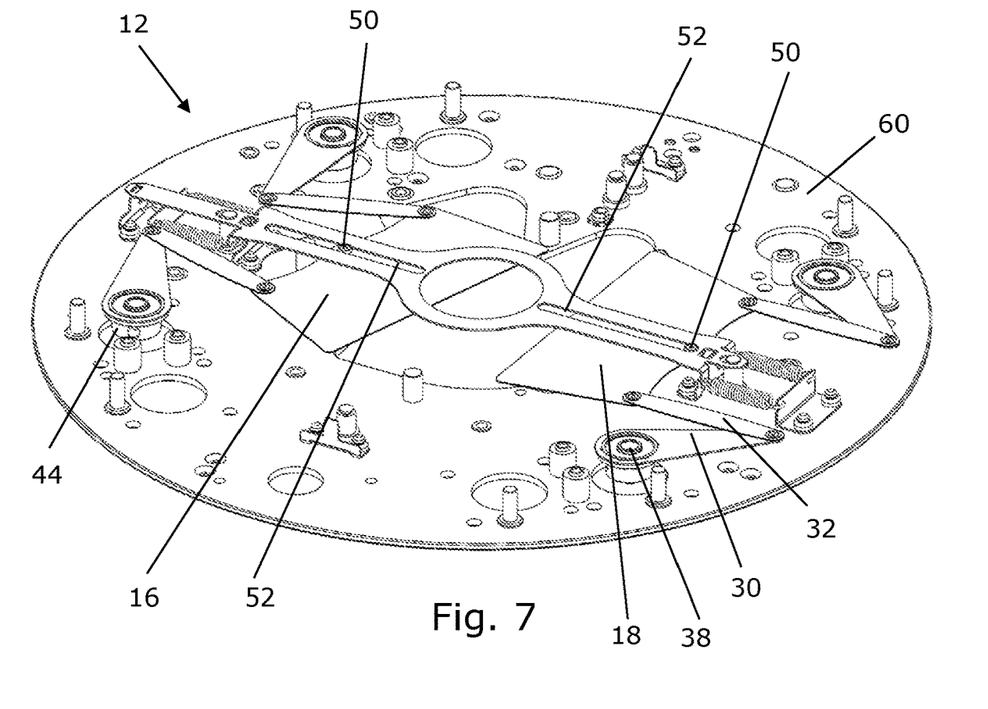
FIG. 7 illustrates an embodiment of a first shutter system.

The pin 50 extend from the outer surface of the blade 16, 18, 20, 22 in a direction away from the blade divider 24. The pins 50 extending from the first blade 16 and the second blade 18 extend through corresponding slots 52 in the first blade guide 34, whereas pins 50 extending from the third blade 20 and the fourth blade 22 extend through corresponding slots 52 in the second blade guide 36.

To allow a light beam to pass through the framing system 10, the first blade guide 34 forms a first aperture 54, and the second blade guide 36 forms a second aperture 56. In the illustrated embodiment, the aperture 26, and the first and second apertures 54, 56 are co-axially arranged.

The framing system 10 further comprises a rotatable frame portion 60. The rotatable frame portion 60 may be arranged for rotation in a light fixture 200 (see FIG. 12). To allow rotation of the rotatable frame portion 60, it may be rotatably attached to a static frame portion 80 (see e.g. FIG. 8A) being fixedly attached to the light fixture.

Figure 2:
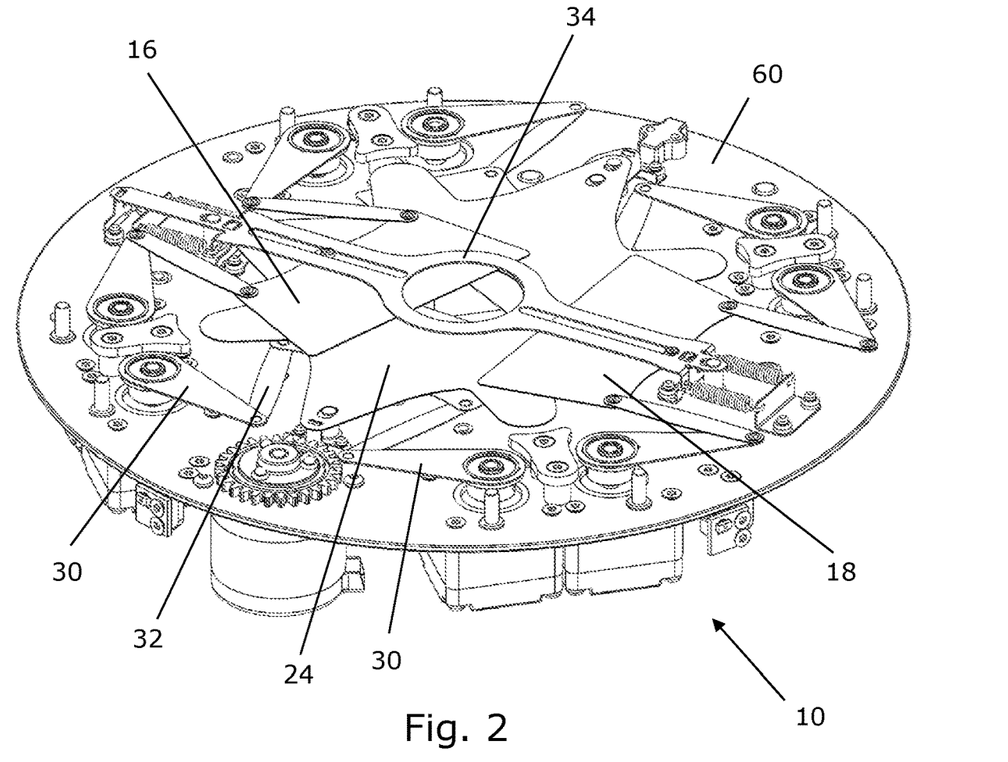
FIG. 2 illustrates an assembled view of an embodiment of a framing system.

FIG. 2 illustrates an assembled view of an embodiment of a framing system 10. The framing system 10 further comprises a rotatable frame portion 60. The first shutter system 12, the second shutter system 14, the blade divider 24, and the first and second blades guides 34, 36 are attached to the frame portion 60 for rotation of the first and second shutter systems 12, 14, the first and second blade guides 34, 36, and the blade divider 24 with the rotatable frame portion 60. The rotatable frame portion 60 may as an example be arranged for rotation in a light fixture 200 (see FIG. 12).

FIGS. 3-7 illustrate embodiments of a blade divider 24, a first blade guide 34, a second blade guide 36, a second shutter system 14, and a first shutter system 12, respectively. Each of these elements are individually disclosed while attached to a rotatable frame portion 60 to illustrate the elements in more detail and to illustrate their individual attachment structures to enable attachment hereof to the rotatable frame portion 60.

Figure 3:
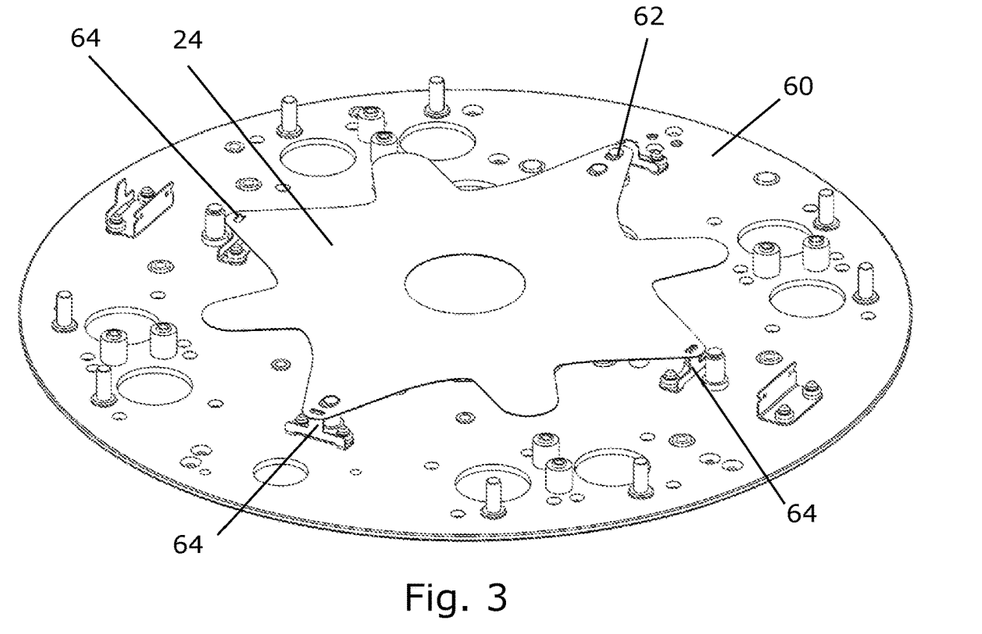
FIG. 3 illustrates an embodiment of a blade divider.

FIG. 3 illustrates an embodiment of a blade divider 24. The blade divider 24 is formed as a substantially flat element. The blade divider 24 is fixedly attached to the rotatable frame portion 60 at a single point 62. Additionally, the blade divider 24 is movably attached to the rotatable frame portion 60 by a plurality of spring structures 64 in the form of leaf springs. Thus, the blade divider 24 is stretched between the single attachment point 62 to which it is fixedly attached and the additional attachment points at which the spring structures 64 are attached to thereby form a drum-skin-like structure.

FIGS. 4 and 5 illustrate an embodiment of a first blade guide 34 (FIG. 4) and an embodiment of a second blade guide 36 (FIG. 5).

The first and second blade guides 34, 36 are likewise attached to the rotatable frame portion 60. The first and second blade guides 34, 36 are at least partly attached via a spring structure 66 arranged to ensure that the first and second blade guides 34, 36 exert a pressure towards the first and second shutter system, respectively. By exerting a pressure towards the first and second shutter systems 12, 14, respectively, the movement of the blades 16, 18, 20, 22 may substantially be in only one plane; i.e. substantially parallel to the blade divider 24. Furthermore, the risk of bending of the blades 16, 18, 20, 22 due to high temperature can be limited.

Each of the first and second blade guides 34, 36 are as the blade divider 24 attached to form drum-skin-like structures.

Figure 6:
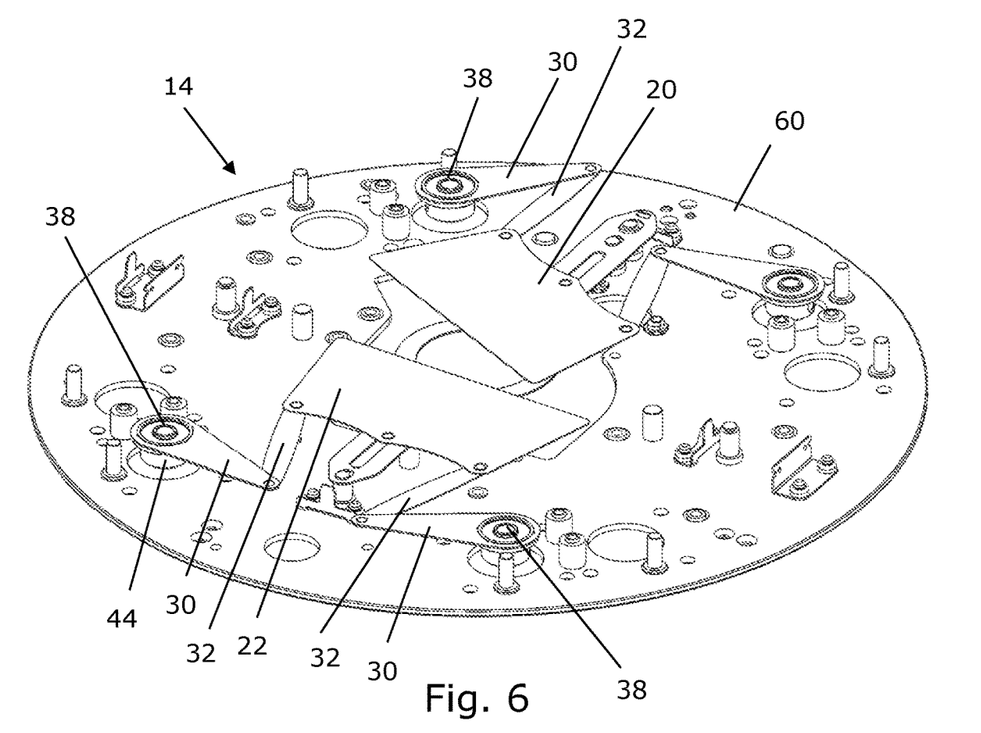
FIG. 6 illustrates an embodiment of a second shutter system.

FIGS. 6 and 7 illustrates an embodiment of a first shutter system 12 (FIG. 7) and an embodiment of a second shutter system 14 (FIG. 6).

The first and second shutter systems 12, 14 are attached to the rotatable frame portion 60 via the motorized bars 30 at the fixed pivot points 38.

Figure 8A:
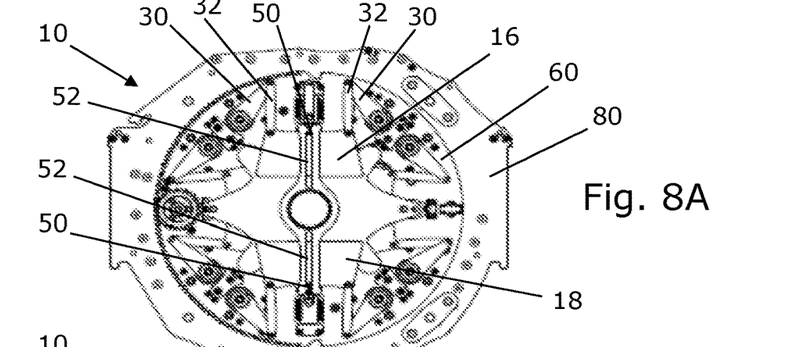
FIGS. 8A-8D illustrates different steps in of a +30 degrees full curtain framing.
Figure 8B:
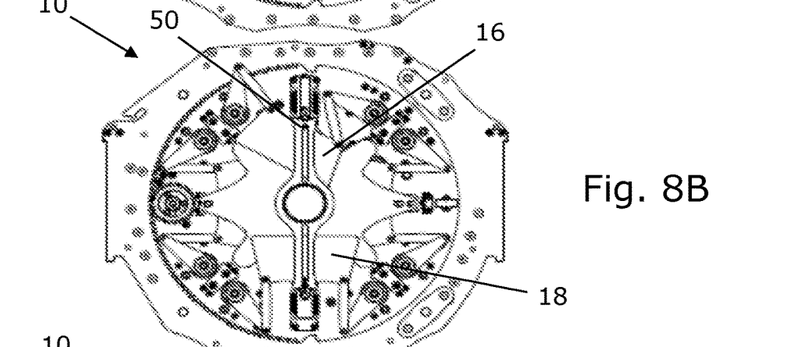
Figure 8C:
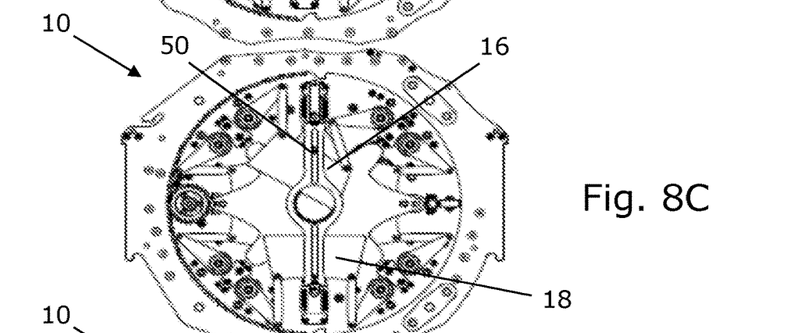
Figure 8D:
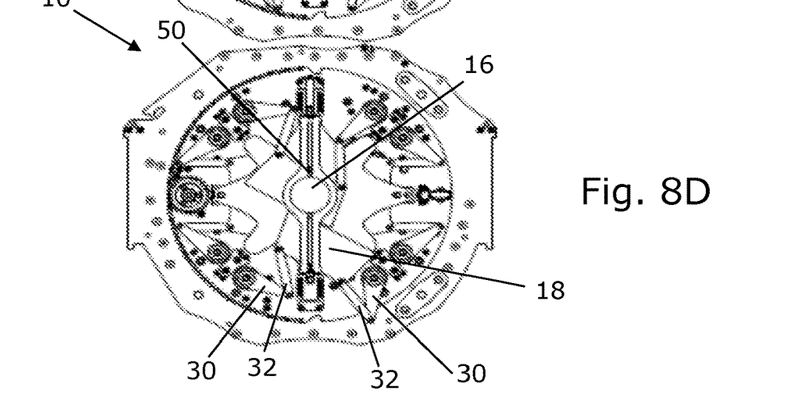

FIGS. 8A-8D illustrates different steps in of a +30 degrees full curtain framing, where FIG. 8A illustrates the first step and FIG. 8D illustrates the last step. The framing system 10 comprises a rotatable frame portion 60 being rotatably attached to a static frame portion 80 which can be fixedly attached to a light fixture, such as inside a moving head.

In the first step, the first blade 16 and the second blade 18 are arranged with their outer portion facing each other in parallel. The pin 50 of each of the first and second blades 16, 18 are in the outermost position in the corresponding slots 52; i.e. at the position away from the aperture 26 in the blade divider 24.

In the second step (FIG. 8B) and the third step (FIG. 8C), the second blade 18 remains at this position, while the first blade 16 in the second step is tilted to an angle of 30 degrees by use of the motorized bars 30 attached to the first blade. In the third step, the first blade 16 is moved towards the aperture 26 to partly shade the aperture, while maintain at an angle of 30 degrees relative to the starting position. The first blade 16 is moved by used of the motorized bars 30.

In the fourth step (FIG. 8D), the first blade 16 fully shades the aperture 26 at an angle of 30 degrees relative to its starting position. The pin 50 of the first blade 16 is moved to the other end of the corresponding slot 52. To avoid collision with the second blade 18, the second blade 18 is tilted 30 degrees relative to its starting position by use of the motorized bars 30 attached to the second blade 18. The pin 50 of the second blade 18 is still in the outermost position in the corresponding slot 52; i.e. at the position away from the aperture 26 in the blade divider 24.

Figure 9A:
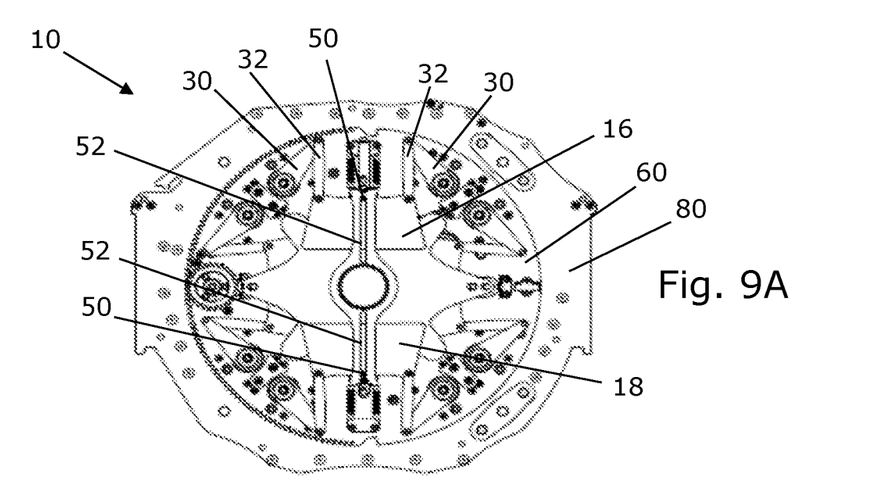
FIGS. 9A-9C illustrates different steps in of a 0 degrees full curtain framing.
Figure 9B:
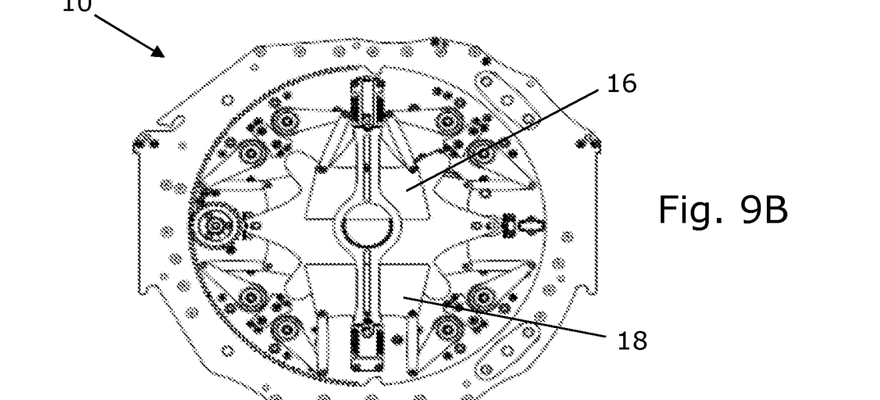
Figure 9C:
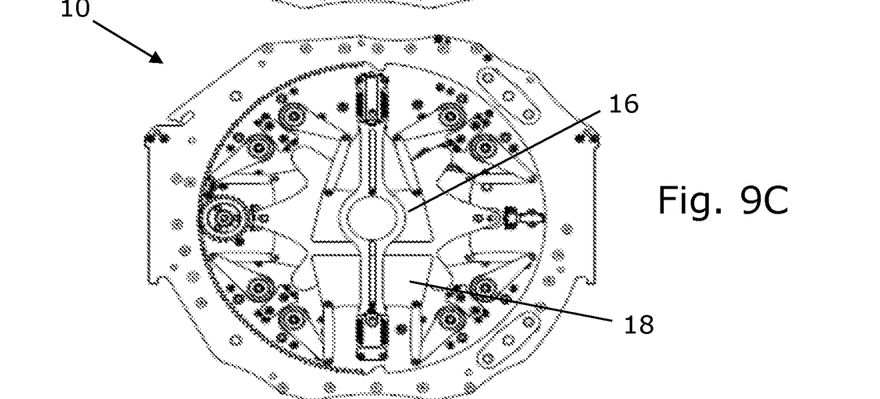

FIGS. 9A-9C illustrates different steps in of a 0 degrees full curtain framing, where FIG. 9A illustrates the first step, and FIG. 9C illustrates the third step.

In the first step, the first blade 16 and the second blade 18 are arranged with their outer portion facing each other in parallel. The pin 50 of each of the first and second blades 16, 18 are in the outermost position in the corresponding slots 52; i.e. at the position away from the aperture 26 in the blade divider 24.

In the second step (FIG. 9B) and the third step (FIG. 9C), the second blade 18 remains at this position, while the first blade 16 in the second step is moved towards the aperture 26 to partly shade the aperture without tilting the first blade 16. The first blade 16 is moved by used of the motorized bars 30 attached hereto.

In the third step (FIG. 9C), the first blade 16 fully shades the aperture 26. The pin 50 of the first blade 16 is moved to the other end of the corresponding slot 52.

Figure 10:
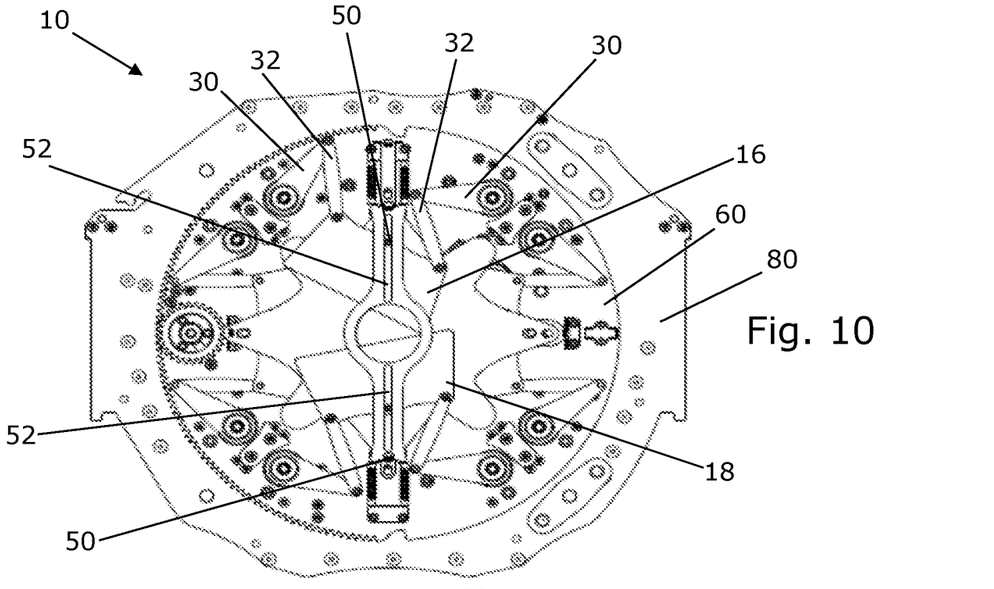
FIG. 10 illustrates a first and a second blade doing 30 degrees framing.

FIG. 10 illustrates a first and a second blade 16, 18 doing 30 degrees framing. The first blade 16 and the second blade 18 have both been tilted to form a common angle of 30 degrees by use of the respective motorized bars 30 attached to each of the first blade and the second blade 16, 18. Additionally, the position of the first and the second blades 16, 18 have been changed, whereby the pins 50 of each of the first and second blade 16, 18 has been moved towards the aperture 54 of the first blade guide 34.

Figure 11:
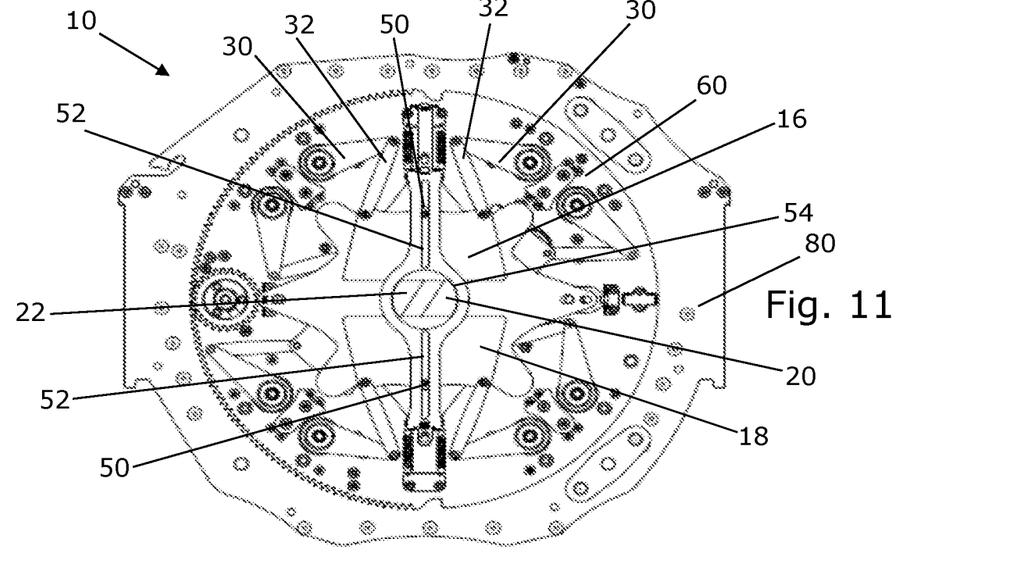
FIG. 11 illustrates a first, a second, a third, and a fourth blade arranged to form a parallelogram.

FIG. 11 illustrates a first, a second, a third, and a fourth blade 16, 18, 20, 22 arranged to form a parallelogram. The position of the first and the second blades 16, 18 have been changed by moving them towards the aperture 26 to partly shade the aperture without tilting the first and second blades 16, 18. The pins 50 of each of the first and second blade 16, 18 has been moved towards the aperture 54 of the first blade guide 34. The third blade 20 and the fourth blade 22 have both been tilted while their outer portions facing each other are still parallel use of the respective motorized bars 30 attached to each of the third blade and the fourth blade 20, 22. The position of the third and the fourth blades 20, 22 have additionally been changed by moving them towards the aperture 26 to partly shade the aperture.

Figure 12:
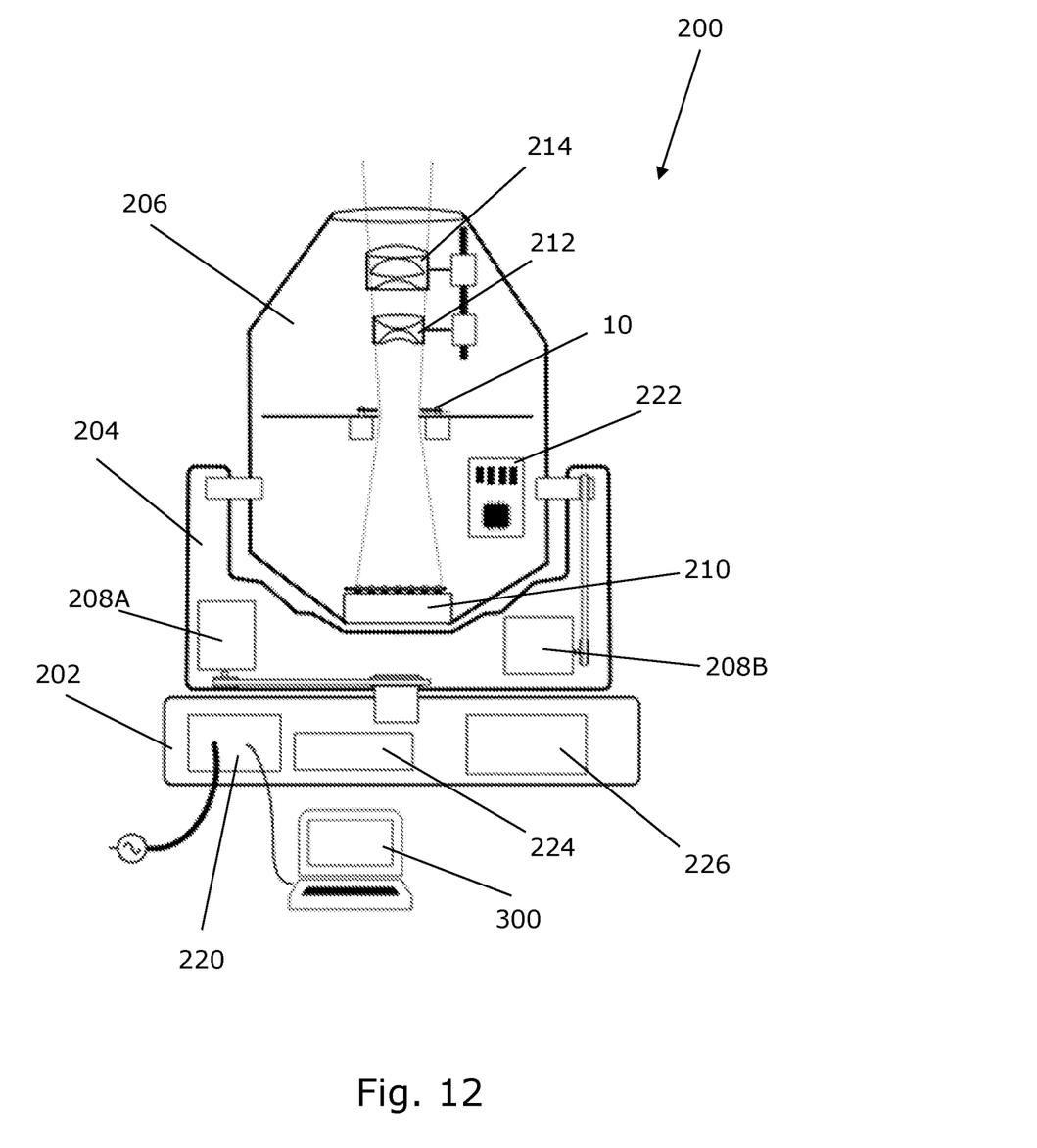
FIG. 12 schematically illustrates a section through an embodiment of a framing system integrated in a moving head light system.

FIG. 12 schematically illustrates a section through an embodiment of a framing system 10 integrated in a moving head light system 200 comprising a light source 210. The moving head light system 200 comprise a base 202, a yoke 204, and a head 206, where the light source and the framing system 10 are arranged in the head 206. Two motors 208A, 208B are arranged for movement of the head 206, where the motor 208A is for rotation of the head 206, whereas the motor 208B is for tilting of the head 206.

To enable additional shaping of the light beam, a zoom device 212 and a focus device 214 are arranged in the head 206. It should be understood that the moving head light system 200 may further comprise other optical devices.

An external computer 300 is in communication with a controller 220 integrated in the base 202. The controller 220 is arranged to control rotation of the rotatable frame portion 60, to control the light source 201, to control movement the head, etc. Additionally, an anti-collision system configured to control movement of the blades 16, 16, 20, 22 to avoid collision between the first blade 16 and second blade 18 and to avoid collision between the third blade 20 and fourth blade 22, respectively, forms part of the controller 220. Additionally, a driver board 222 is arranged in the head 206 for control of the head 206 and the light source 210. The driver board 222 is in communication with the controller 220.

In the illustrated embodiment, the base 202 further comprises a user input element 224. The user input element 224 may as an example comprise bottoms, touch pad(s), a keyboard, etc. Additionally, the base 202 comprises a display 226 enabling a user to interact with the user input element 224.

What is claimed is:

1. A framing system for shaping a light beam, the framing system comprising:
    a first shutter system comprising a first blade and a second blade;
    a second shutter system comprising a third blade and a fourth blade; and
    a blade divider forming an aperture, the first shutter system and the second shutter system being arranged on opposite sides of the blade divider, wherein the first blade and the second blade are adjacent to a first side of the blade divider and the third blade and the second blade are adjacent to a second side of the blade divider;
    wherein each blade constitutes an intermediate bar in a five-bar linkage between two sets of outer bars, each set comprising a motorized bar and a passive bar, and wherein at least one of the motorized bars has a length being larger than a diameter of the aperture.

2. The framing system of claim 1, wherein each of the motorized bars has a length being larger than the diameter of the aperture.

3. The framing system of claim 1, further comprising a first blade guide and a second blade guide, the first shutter system being arranged between the blade divider and the first blade guide, and the second shutter system being arranged between the blade divider and the second blade guide, wherein the first and second blade guides each comprises a spring structure arranged to exert a pressure towards the first and second shutter system, respectively.

4. The framing system of claim 3, wherein a pin extends from each of the blades, each pin extending through a corresponding slot in one of the first and second blade guides to constrain movement of the blades.

5. The framing system of claim 1, further comprising a plurality of actuators, wherein an actuator is operatively attached each of the motorized bars, the actuators being arranged for movement of the blades.

6. The framing system of claim 5, wherein at least one of the actuators comprises a step motor.

7. The framing system of claim 4, wherein each blade is movable within a range of at least +/−30 degrees for any position of the pin in the corresponding slot.

8. The framing system of claim 1, wherein each of the motorized bars extends between a fixed pivot point and a floating pivot point, each of the motorized bars being rotatable around the fixed pivot point between an upper limit position and a lower limit position, and wherein a blade is rotated at least 30 degrees, when one of the motorized bars is in the upper limit position and the other one of the motorized bars is in the lower limit position.

9. The framing system of claim 3, wherein the first blade guide forms a first aperture, and the second blade guide forms a second aperture, wherein the aperture, and the first and second apertures are co-axially arranged.

10. The framing system of claim 9, wherein a first and a second slot are arranged in the first blade guide, and wherein a third and a fourth slot are arranged in the second blade guide, the first and second slots extending on opposite sides of the first aperture, and the third and the fourth slots extending on opposite sides of the second aperture.

11. The framing system of claim 1, further comprising a rotatable frame portion, wherein the first shutter system, the second shutter system, and the blade divider are attached to the frame portion for rotation of the first and second shutter systems and the blade divider with the frame portion.

12. The framing system of claim 1, further comprising an anti-collision system configured to control movement of the blades to avoid collision between the first blade and the second blade and between the third blade and the fourth blade, respectively.

13. The framing system of claim 12, wherein the anti-collision system comprises a memory arranged to read an angular position of the motorized bars, and a kinematic model configured to transform the angular position of the motorized bars to define an orientation and a position of the blades to control that the first and second blades and the third and fourth blades, respectively, do not overlap.

* * * * *